Figure 1:
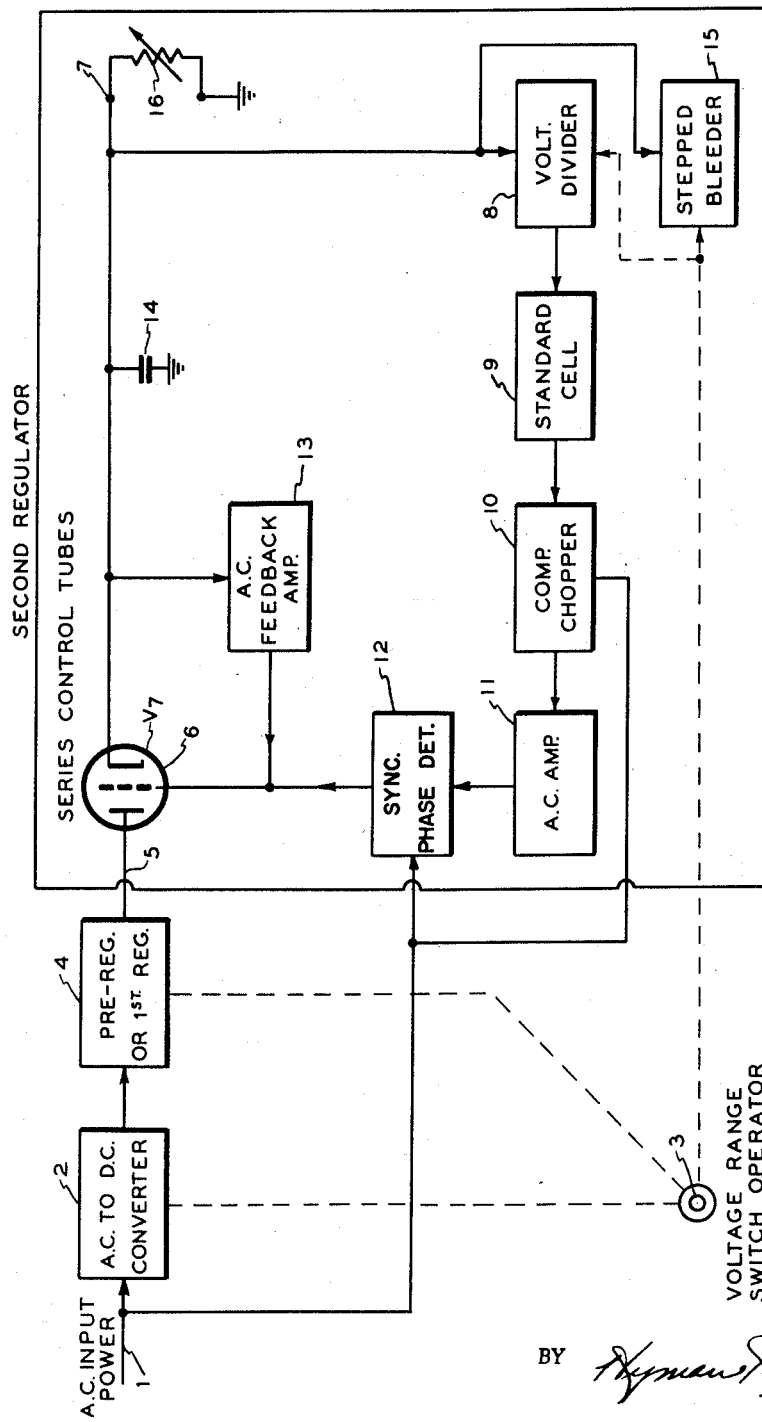

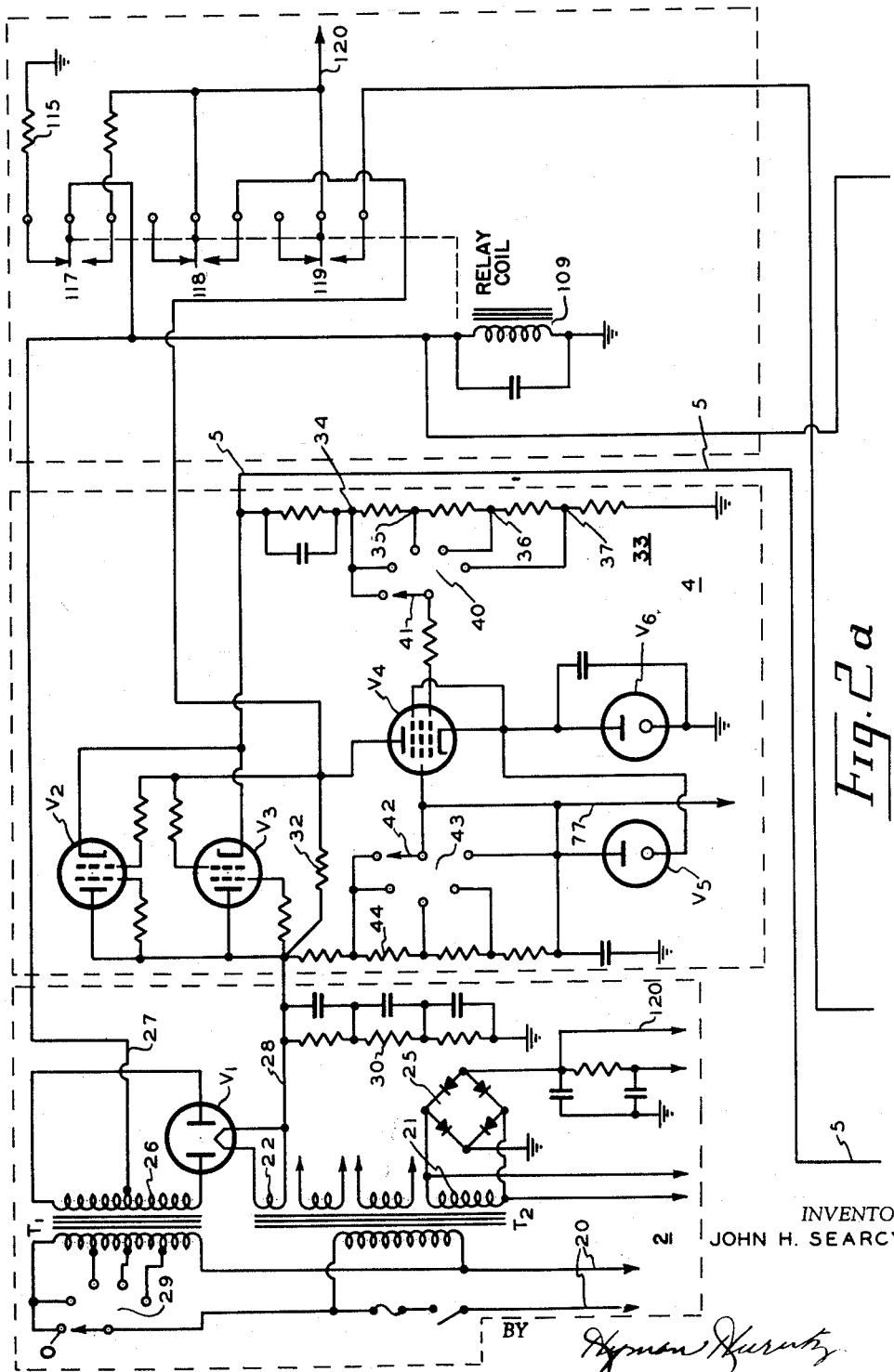

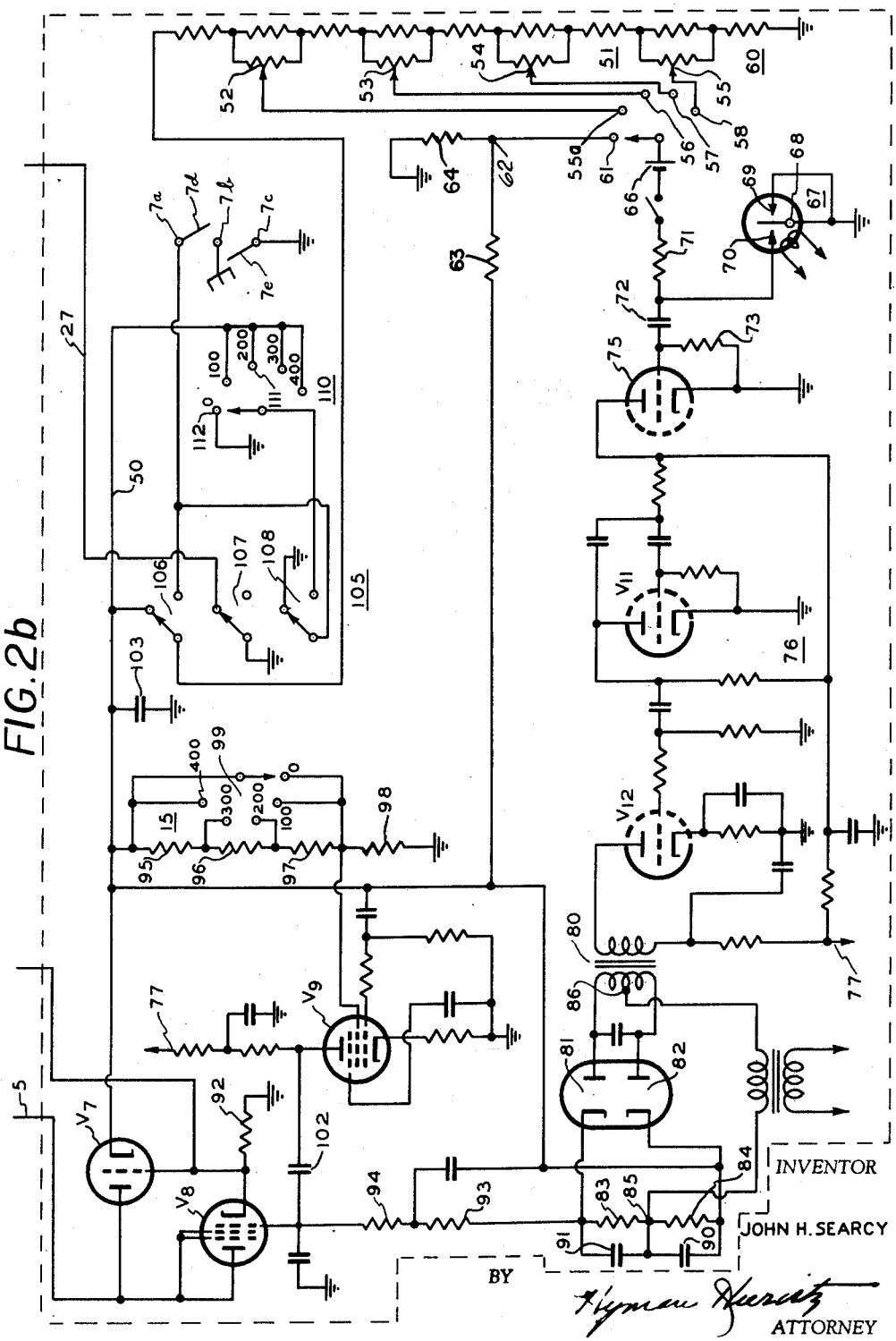

United States Patent Office 2,936,413
Patented May 10, 1960

2,936,413

MDC-3A REGULATOR

John Holden Searcy, Melbourne, Fla., assignor to Radiation, Inc., Melbourne, Fla., a corporation of Florida Application February 27, 1956, Serial No. 567,989

17 Claims. (Cl. 321—18)

The present invention relates generally to regulated voltage sources, and more particularly to highly regulated or super-regulated sources of voltage, selectively positive or negative with respect to ground, in which any of a plurality of selected values of supply voltage is maintained constant for a wide variety of load currents, by comparison of the supply voltage with that of a standard cell.

Briefly describing the invention, in a preferred embodiment thereof, A.-C. input is supplied to an A.-C. to D.-C. converter, via a variable tap transformer, permitting the provision of D.-C. supply voltage in discrete widely separated stepped values. The selected value of D.-C. supply voltage is regulated in a first regulator, or pre-regulator, which assures rough maintenance of output voltage over a wide range of output or load currents, and for a wide range of available values of A.-C. supply voltage.

The pre-regulated D.-C. voltage is subjected to a second regulation, which includes features assuring extremely accurate or fine regulation, in distinction to the relatively rough regulation which is provided by the pre-regulator. Specifically, the finely regulated output voltage is compared with the voltage of a standard cell, and an A.-C. error voltage generated which has a phase and amplitude determined by the sense and degree in which the finely regulated output voltage, or some pre-determined fraction thereof, departs from the voltage of the standard cell.

The A.-C. error voltage is amplified, and the amplified error voltage synchronously phase detected, to provide a D.-C. error voltage. The detected value is utilized to control a series regulator value in the lead carrying the finely regulated output voltage.

The A.-C. error voltage is generated by a mechanical "chopper," and the A.-C. chopper amplifier is limited in its frequency response to about 5 c.p.s., in one actual design of a system in accordance with the invention. Accordingly, the A.-C. chopper amplifier is supplemented by an A.-C. degenerative feed-back amplifier, which also functions as part of a filter network in the output of the synchronous detector. The synchronous detector drives a cathode follower, which in turn drives the series regulator valve. This arrangement assures low output impedance drive for the control grids of the series regulator valve, which may draw grid current, while providing a high impedance load for the filter network.

It is necessary that a fixed minimum current be drawn from the supply under all conditions of operation, in order to reduce the required control range of the series control tubes. A fixed current drain is provided for all output voltage settings by an adjustable stepped bleeder resistance network.

A load sensing resistor is connected in the negative D.-C. lead of the A.-C. to D.-C. converter of the system, and is in shunt to an overload relay. Should excess current flow in the resistor, the relay will develop sufficiently high voltage to operate the relay, which biases off the series regulator tubes of the system. The relay is self-locking, so that once operated it can be unlocked only by turning off the main power switch of the system, or actuating an On-Off switch to Off position.

It is, accordingly, a broad object of the present invention to provide a super-regulated stepped voltage supply.

It is a more specific object of the invention to provide a novel system of voltage regulator including a pre-regulator and a super-regulator, the latter providing regulation by comparison with the voltage of a standard cell.

It is still another object of the present invention to provide a novel system of voltage regulation which employs A.-C. degenerative feed-back to a series regulator tube, to reduce ripple voltage.

It is a further feature of the present invention to provide an A.-C.-D.-C. converter system capable of providing a wide range of D.-C. output voltages by providing a like wide range of A.-C. input voltages.

The above and still further objects, features and advantages of the present invention will become apparent upon consideration of the following detailed description of one specific embodiment thereof, especially when taken in conjunction with the accompanying drawings, wherein:

Figure 1 is a block diagram of a system in accordance with the invention; and

Figures 2a and 2b constitute a schematic circuit diagram of the system of Figure 1.

Referring now more particularly to Figure 1 of the accompanying drawings, there is illustrated in functional block diagram the main elements of a system of voltage regulation in accordance with the present invention. Specifically, A.-C. input power from a 60 c.p.s. source is supplied via lead 1 to an A.-C. to D.-C. converter 2. By means of a selector switch operator 3, the latter is caused to supply any one of a plurality of discrete values of A.-C. voltage and hence of D.-C. voltage, the latter selected by way of example as 0 v., 100 v., 200 v., 300 v. and 400 v. The converted and selected D.-C. voltage is subjected to pre-regulation in a first or pre-regulator 4, which is adjusted to operate at the required selected D.-C. voltage by the switch operator 3. On the output lead 5 is provided, accordingly, a roughly regulated output voltage having one of the selected values. The pre-regulator 4 maintains the selected value of voltage over a wide range of load curents and A.-C. line voltages, utilizing a gaseous voltage regulator tube as a voltage standard.

A voltage divider 8 is responsive to the switch selector 3, to select a portion of the voltage appearing at terminal 7. That portion is required to match precisely the voltage of a standard cell 9. Insofar as there is a difference, that difference may be positive or negative. A comparator chopper 10 generates an A.-C. error signal in the form of a voltage wave, in synchronism with the A.-C. supply, having a magnitude corresponding with the magnitude of the difference. The error signal is amplified by an A.-C. amplifier 11, and the output of the latter detected, as to both phase and amplitude by the synchronous electronic phase detector 12. The latter supplies a D.-C. output signal having a polarity and magnitude representative of the A.-C. error signal for application to the control grid of the series control tube 6.

The main servo loop possesses a relatively slow response, of the order of a few c.p.s. Rapid variations of output voltage, to perhaps 100 kc., are removed by an A.-C. feed-back amplifier 13, which feed degeneratively to the control grid of series control tube 6 any variation of voltage at terminal 7. Variations at frequencies above the maximum susceptible of elimination by A.-C. feed-back amplifier 13 are by-passed to ground by means of a condenser 14.

It is essential that the series control tube 6 have always a definite flow of D.-C. current, which determines or establishes the operating point for the tube. This flow is established by a stepped bleeder resistance 15, which is adjustable step-wise in response to the voltage range switch operator 3, to provide a constant current drain on the series control tube 6, suitable for the voltage at the output terminal 7. The useful load 16 is connected in parallel with the bleeder resistance 15.

Reference is now made particularly to Figure 2 of the accompanying drawings, which illustrates schematically a circuit diagram of an exemplary system designed in accordance with the present invention.

A source of input power, at 60 c.p.s., is illustrated at 20. The source 20 is connected to the primary windings of two transformers T1 and T2 in parallel. The latter transformer is provided with a plurality of secondary windings 21, 22 . . ., which supply filament or heater power to vacuum tubes of the system, the winding 21 additionally supplying a rectifier unit 25, which supplies two D.-C. voltages, i.e. −24 v. and −32 v., for example. The winding 22 supplies filament power to a double diode high voltage rectifier tube V1, having two anodes supplied with voltage in push-pull relation by secondary winding 26 of transformer T1. A low voltage D.-C. lead 27 is connected to the center of secondary winding 26, and a high voltage D.-C. lead 28 is connected to the filament of rectifier tube V1. The primary winding of transformer T1 is provided with a plurality of taps, selectable by means of a selector switch 29 at one side of line 20. The taps are, in one preferred embodiment of the invention, arranged to provide system output voltages of 100 v., 200 v., 300 v., and 400 v. The 100 v. tap utilizes the entire primary winding and is directly connected to a further switch tap labelled "0," for purposes which will appear as the description proceeds. The high voltage lead 28 is filtered by filter 30.

The first regulator or pre-regulator 4 is supplied by leads 27, 28 with D.-C. voltage, of levels sufficiently above the required output values of 100 v., 200 v., 300 v. and 400 v. to allow for voltage drops in the series elements of the overall system.

The lead 28 is connected in series with the anodes of tetrode regulator tubes V2, V3, connected in parallel at all electrodes. These tubes are utilized as variable resistances, in conventional fashion, by applying control voltage to the grids. The cathodes of tetrodes V2, V3 are connected to lead 5, which supplies the second or fine regulator. The voltage on lead 5 is maintained within fairly close limits, at values of about 100 v. above the actual required output values, to allow for voltage drops in the second or fine regulator.

The lead 28 is connected in series with an anode load resistance 32 and a bias control pentode V4. The anode of pentode V4 is connected directly with the control grids of series control tubes V2, V3. The cathode of pentode V4 is connected to ground via a gaseous voltage regulator valve V6, which establishes the cathode V4 at a fixed reference value of D.-C. voltage with respect to ground. A multiple tap potentiometer 33 is connected between output lead 5 and ground, the taps 34, 35, 36, 37 being connected to the stationary points of a selector switch 40, having a movable arm 41. The latter is connected to the control grid of bias control pentode V4. The switch 40 is ganged with the switch 29, the tap points 34, 35, 36, 37 corresponding respectively with voltage values of 0 and 100, 200, 300, 400 v. Accordingly, as the voltage on lead 28 increases, step-wise, the voltage on the control grid of pentode V4 decreases, being always positive with respect to ground. However, this bias is equal normally to the potential of the cathode, which is maintained fixed in potential above ground by gaseous reference VR tube V6.

The screen grid of pentode V4 is maintained at a fixed difference of potential with respect to cathode by VR tube V5, which is connected between cathode and screen grid of pentode V4. To supply the required screen voltage VR tubes V5 and V6 are connected in series with each other to a movable switch arm 42 of a five contact switch 43. The stationary contacts of switch 43 are connected to taps on a potentiometer 44, which in turn is connected between lead 28 and the anode of VR tube V5. Switch 43 is ganged with switches 29 and 40. Accordingly, the switch 43 serves to short out sections of the potentiometer 44 and thus to vary the resistance in series with the VR tubes V5 and V6. The purpose of this circuitry is to control the current flowing through the VR tubes V5 and V6, and the voltage in series therewith, and not to vary screen voltage. The latter is fixed (at 300 v.) by the VR tubes V5 and V6, but the current in the latter must be maintained at suitable value if they are to sustain the required values of voltage, for all possible values of voltage on lead 28.

*Operation of first regulator*

A selected value of D.-C. voltage being required at lead 5, the ganged selector switches 29, 40 and 43 are set to that value. The switch 29 selects the required number of primary turns of transformer T1. The switch 43 selects a value of resistance in variable resistance 43 which permits the regulator valves V5 and V6 to operate satisfactorily at the voltage which appears at lead 28, more sections of resistance 44 being cut in as the voltage on lead 28 increases.

The selector switch 40 biases the tube V4 suitably for the desired value of pre-regulated voltage, maintaining the bias relative to cathode potential as the required voltage increases. Any difference of potential represents an error signal. Thereby, the voltage at the anode of tube V4 is varied, relative to ground, and the biases on series regulator tubes V2, V3 correspondingly varied with respect to ground.

When it is desired to increase the voltage at lead 5, the input voltage at lead 28 is increased by changing the turns ratio of transformer T1. Simultaneously additional resistance is inserted in series with VR tubes V5 and V6, so that these may maintain the cathode and screen voltages of pentode V4, and a new tap on potentiometer 34—37 is selected, which decreases the fraction of the available voltage which is applied to the control grid of triode V4 sufficiently to compensate for the increase of voltage across the entire potentiometer due to the increased input or supply voltage.

Having selected a stepped value of output voltage, any increase of this voltage causes an increase with respect to ground, or with respect to cathode, of the voltage at the control grid of pentode V4. This change of bias is accompanied by a change of plate voltage at pentode V4, relative to ground. Since the control grids of series regulator tubes V2, V3 are connected directly to the plate of pentode V4 the normal bias on these tubes is varied, with a consequent variation of internal impedance. The changed internal impedance causes a changed voltage drop in regulator tube V2, V3, and a consequent change in voltage at lead 5. The chain of events which occurs on decrease of voltage at lead 5 is reversed with respect to that which occurs on increase. In either case the loop reacts degeneratively to any attempted variation of output voltage.

However, the total stabilization which can be effected of voltages existing on lead 5, by reference to VR tube V6 taken as a standard, is not sufficient for many purposes. For example, in one commercially produced embodiment of the present invention, it is desired to provide voltage of 0 v., 100 v., 200 v., 300 v., and 400 v., which shall retain rated values to an accuracy of ±0.05%, with less than 0.2 millivolt of peak-to-peak ripple at full voltage output, on the assumption that the supply voltage may vary between 105–125 v., and load current vary between 0 and 125 ma. This objective may be accomplished by further regulating the voltage at lead 5, the second regulation taking place by reference to an accurate standard, such as a standard cell. The first or pre-regulator serves, then, to reduce the required range of regulation of the second regulator, and to permit utilization of an extremely sensitive and accurate regulator system, which is capable of regulating a relatively small range of voltage variation.

*Second regulator*

The voltage on lead 5 is arranged to be 100 v. higher than is required at the output terminals of the system. The lead 5 is connected in series with a series regulating triode V7 (or a plurality of these in parallel). The cathode of triode V7 is connected to an output lead 50. The triode V7 takes up the excess voltage referred to.

The lead 50 is connected to ground via a voltage divider 51, consisting of a plurality of series connected resistances. Alternate ones of these resistances are supplied with shunting potentiometers, from which variable taps 52, 53, 54, 55 are connected to stationary switch contacts 55a, 56, 57, 58, respectively, of a selector switch 60. These contacts represent output voltage values of 100 v., 200 v., 300 v. and 400 v., respectively. Additionally, a zero volt contact 61 is provided. The contact 61 is connected to the mid-point 62 of a voltage divider consisting of two resistances 63, 64, connected directly in series between lead 50 and ground. The values of resistances 63, 64 are so selected that the 0 voltage selection position of the stepped selector switches of the system provide 100 v. on lead 50.

The potentiometers 52, 53, 54, 55 are designed to permit fine and highly accurate adjustment of voltages taken from the voltage divider 51, of the order of a small fraction of a volt, for purposes of calibration or the like.

The selector switch 60 steps down the voltage available at its movable arm, to compensate for the various values of voltage which may be selected to appear at lead 50, providing always a nominal value which precisely balances that of a standard cell 66, when attained.

A synchronous chopper 67 is provided, having a grounded vibrator contact 68, a grounded stationary contact 69, and a further stationary contact 70, which is connected via a protective resistance 71 to the negative side of standard cell 66. The positive side of standard cell 66 is connected to the movable arm of step switch 60.

A condenser 72 is connected from contact 70 through a resistance 73 to ground. The resistance 73 is connected between cathode and grid of a triode 75. The vibrator contact 68 grounds one side of condenser 72 in synchronism with the supply frequency. When ungrounded, the condenser 72 is subjected to the difference between the voltage of the standard cell 66 and that available at switch 60 or a fixed fraction thereof. The difference in error voltage may be positive, or negative, or zero. Hence, the current flow in condenser 72 and in resistance 73 has a phase dependent on the sense of unbalance of the system, i.e. whether the output voltage is higher or lower than the desired value, and a magnitude dependent on the extent of the unbalance. The A.-C. error voltage is amplified in an A.-C. error amplifier 76, comprising triode 75, and additional cascaded triodes V11 and V12, all supplied with D.-C. plate voltage from lead 77, which is connected to the anode of VR tube V5. The output circuit of the A.C. error amplifier 76 is a transformer 80, having its primary winding connected in the anode circuit of the triode V12. The secondary winding of transformer 80 is tuned to the supply frequency, and is connected at its respective end terminals to the anodes of a pair of diodes 81, 82. The cathodes of diodes 81, 82 are joined by two equal series connected load resistances 83, 84. The junction 85 of resistors 83, 84 is connected to one terminal of an A.-C. supply source, while the center tap 86 of the secondary winding of transformer 80 is connected to the other terminal.

The diodes 81, 82 are thus subjected to co-phasal A.-C. voltage directly from the A.-C. supply, and become conducting co-phasally on alternate half angles of the supply. The net voltage developed across load resistors 83, 84, taken in series, is zero, since equal and opposite voltages are developed across the separate resistors 83, 84. The voltage applied to the diodes 81, 82 by the transformer 80 is contra-phasal, and tends to reduce current flow in one of the diodes and to increase current flow in the other, in that the co-phasal voltage applied to the diodes is supplemented in one diode circuit, and reduced in the other. Accordingly, in the presence of error signal output a net D.-C. voltage is developed across resistors 83, 84, which is representative of the error signal in both polarity and magnitude. The cathode of the diode 82 is connected directly with lead 50, and the voltage developed across resistors 83, 84 thus is either added to or subtracted from the net output voltage of the system. Since the voltages developed by diodes 81 and 82 are pulsating, smoothing condenser 90, 91 are connected across the load resistors.

It will be recalled that a series regulating triode V7 is connected between lead 5, which carries roughly regulated D.-C. voltage, and lead 50, which carries super-regulated voltage. The triode V7 tends to draw considerable grid current. It is driven, therefore, from a low impedance driver consisting of a cathode follower pentode tube V8, having a cathode load 92. The cathode of pentode V8 is connected directly with the grid of series regulator tube V7, and the low potential side of the cathode load 92 is grounded. The anode of the driver tube V8 is connected directly with the anode of the regulating valve V7, and the control grid of the driver valve V8 is connected via phase correcting resistances 93, 94 to the cathode of diode 81. The grid circuit of driver tube V8 provides a high impedance load for the output circuit of the diodes 81, 82.

In operation, and assuming no error signal, the net voltage appearing between anode and control grid of driver tube V8 is that between leads 5 and 50. This value remains relatively constant. The voltage between anode and ground is subject, however, to wide stepped variations. It follows that the voltage across cathode load 92 is subject to the same stepped variations. The latter are communicated to the control grid of series regulator tube V7. However, the anode voltages of tubes V7 are also varying step-wise, while the cathode is free to vary, so that the tube V7 introduces a virtually constant voltage drop at all values of stepped voltage.

It is essential that the series regulator tube V7 draw a fixed minimum current at all times, and regardless of the actual load current drawn, in order to establish an operating point for the tube which reduces its control range. This drain is provided by a stepped bleeder resistance 15, connected between lead 50 and ground, and including four fixed resistances 95, 96, 97, 98, in series. A five point selector switch 99, having a switch arm connected to lead 50, and one stationary contact connected to lead 50, has its remaining stationary contacts connected to the junction points of resistances 95, 96, 97, 98. The bleeder 15 is arranged to draw approximately 20 ma. for all selected output voltages, the resistance 98 along being in circuit, however, for output voltages of both 0 and 100 v.

The voltage across resistance 98, which is arranged to remain at 100 v. for all settings of switch 99, is applied to the screen grid of an A.-C. feed-back pentode V9. The anode of pentode V9 is supplied with 300 v., deriving from lead 77. The control grid of pentode V9 is coupled via condenser 101 to the lead 50 and its anode is coupled via condenser 102 to the control grid of driver tube V8. The pentode V9, accordingly, feeds A.-C. voltage variations on lead 50 back into the series regulator valve V7 in degenerative phase. The utility of an A.-C. degenerative loop derives from the fact that the A.-C. error amplifier 76 has a relatively low frequency cut-off, i.e. at about 5 c.p.s. Ripple voltage may occur on lead 50, having frequencies to several hundred kc. These are damped by the A.-C. feed-back loop, to about 100 kc. A by-pass condenser 103 keeps the output impedance to ground of lead 50 at a low or negligible value for frequencies above 100 kc.

The gain of pentode V9 causes the apparent capacity in its anode circuit to have an increased value, so that a relatively small condenser 102 may be employed in conjunction with resistors 94 and 93 for a phase correction network.

An On-Off switch assembly 105 is provided, illustrated in the Off position, and including three single-pole double-throw switches 106, 107, 108. In the Off condition of the switch assembly, 105, lead 50 is connected in series with the voltage divider 51, via switch 106, and lead 27 is grounded via switch 107, which shorts a relay coil 109. An output terminal of the system, 7a, is also grounded, via switch element 108. A selector switch 110 is provided, having four stationary contacts, 111, which correspond respectively with output voltage values of 100 v., 200 v., 300 v. and 400 v., and which are all connected permanently to lead 50. A fifth contact 112, at 0 volts position, is permanently grounded.

When the switch assembly 105 is in its Off position, no output voltage is available at the output terminal 7a, which is disconnected from lead 50 at switch 106. If switch 110 is set to any value other than 0 volts, the lead 50 is connected to an open point of switch 108. Since selector switch 110 is ganged with the other selector switches of the system, the load impedance as seen by the system is infinite.

When the switch assembly 105 is in the On position, for any value except 0 volts output, the output terminal 7a is connected to the high voltage end of voltage divider 51, via switch 106, and to the lead 50 via any of switch contacts 111 of selector switch 110. At the same time the relay 109 is disconnected from ground, at switch 107, and is connected in parallel with a resistance 115, which lies in series with the ground lead 27 of the A.C.-D.C.-converter 2. The total power drawn by the system flows through resistor 115, and develops a voltage for application to relay coil 109. The latter actuates its contacts only if excess current is drawn by the system. The relay coil 109 operates three sets of contacts 117, 118, 119. The contacts 117 transfer the lead 27 to a —32 v. D.-C. lead 120. The latter voltage maintains the relay coil 109 in energized condition, or locks it in. The switch 118 transfers the voltage on lead 120 to the control grids of tubes V2 and V3 which biases the latter tubes to cut-off. The switch 119 transfers negative voltage from lead 120 to the control grid of tube V7, disabling that tube.

The entire system is thus disabled in response to an overload until the main power switch of the system is opened, or the On-Off switch 105 returned to Off condition.

The present system may be employed in conjunction with a super-regulated interpolation voltage source, capable of providing any desired output voltage, from zero to above 100 v., in small steps and with extreme accuracy. The combination of a stepped source, and an interpolation source, provides substantially continuously variable super-regulated D.-C. voltage, over the range zero to above 500 v. In order to possess utility in such a combination the system of the present invention must be capable of providing 0 volts output. To this end the several selector switches of the system are provided with "0" positions. However, it is desirable that the entire system remain operative in this condition, so that delay will not occur should a selected value other than zero follow selection of zero.

The selector switch 29 provides the same A.C. voltage at transformer T1 for "0" volts as for 100 v., and the 0 and 100 volt contacts are directly connected together in selector switches 43 and 40. It follows that 200 volts appears at lead 5, for "0" setting of the selector switches. The comparison voltage applied to the standard cell 66, at terminal 61, is set for 100 v., and the voltage divider 51 is grounded at its high voltage end, via switches 106, 108, and contact 112 of switch 110. The terminal 7a is grounded via switch 108 and contact 112 of switch 110. The lead 50 is disconnected from the output terminal 7a, at switch 106, and at switch 110.

The system then operates as for 100 v. output and open circuit load when actually set for 0 v. output, and the output terminal 7a is grounded.

Three output terminals 7a, 7b and 7c are provided. The terminal 7b is connected to the chassis of the system and the terminal 7c to the common grounding system. Switch arms 7d and 7e permit connection of terminals 7a to 7b or 7c to 7b. The chassis of the system is isolated from the common grounding system. If then, switch 7e is closed, the chassis is connected to the negative terminal 7c of the system. If switch 7d is closed, the chassis is connected to the positive terminal 7a of the system.

While I have described and illustrated one specific embodiment of my invention, it will be clear that variations of the general arrangement and of the details of construction which are specifically illustrated and described may be resorted to without departing from the true spirit and scope of the invention as defined in the appended claims.

I claim:

1. A voltage regulator comprising an A.-C. to D.-C. converter, means for adjusting said A.-C. to D.-C. converter to provide any one of a plurality of discrete values of unregulated D.-C. output voltage, a pre-regulator for pre-regulating any of said plurality of discrete values of unregulated D.-C. output voltage, a further regulator for regulating said plurality of discrete values of D.-C. output voltage within precise limits, said regulator including means for comparing the D.-C. voltage output of said further regulator with the voltage of a standard voltage cell and developing an A.-C. error signal in response to a difference between a predetermined fraction of said D.-C. output voltage and said voltage of a standard cell, an electronic phase detector for detecting the phase and amplitude of said A.-C. error signal and developing a D.-C. error signal having a signal and a magnitude corresponding with the phase and amplitude of said A.-C. error signal, and means for controlling said further regulator in response to said D.-C. error signal, wherein said voltage regulator includes ganged switching means for controlling the operating configuration of said voltage regulator in accordance with any desired one of said plurality of discrete values of D.-C. output voltage.

2. The combination in accordance with claim 1 wherein is provided a series control device in said pre-regulator and a further series control device in said further regulator, said series control devices in series with each other and with an output terminal, and an A.-C. degenerative feed-back loop connected between the output and input circuits of said further series control device.

3. A voltage regulator for providing discrete widely separated values of regulated D.-C. output voltage in response to a predetermined nominal value of A.-C. input voltage, comprising a transformer having a primary winding and a secondary winding, a plurality of taps on said primary windings, means for selectively connecting said A.-C. input voltage to preselected ones of said taps at will, an A.-C. to D.-C. rectifier in series with said secondary winding, a vacuum tube series control device in series with said A.-C. to D.-C. rectifier, said series control device include a control grid device for varying the internal resistance of said series control device, a control tube for controlling a voltage applied to said control grid device, said control tube including an anode, a control grid, a screen grid and a cathode, an anode load for said anode, means connecting said anode load in series between said A.-C. to D.-C. converter and said anode, a gaseous voltage reference device in series between said cathode and a point of fixed reference voltage, means for supplying a pre-selected value of current to said voltage reference device from said A.-C. to D.-C. converter, means for selecting said pre-selected value of current concomitantly with selection of said taps, means for deriving an error signal for said control grid, said last means including means for selectively applying predetermined fractions of regulated D.-C. voltage to said control grid concomitantly with selection of said taps.

4. A voltage regulator comprising, a transformer having a primary winding and a secondary winding, a plurality of taps for said primary winding, a full wave rectifier in series with said secondary winding for providing stepped unregulated D.-C. voltages, a plurality of resistances connected in series, a switch contact connected to each junction of two of said resistances, a first gaseous voltage regulator tube, a second gaseous voltage regulator tube, means connecting said gaseous voltage regulator tubes in series with each other and with said resistances, a series regulator valve for regulating said D.-C. voltages, a control tube for said series regulator valve, said control tube including an anode, a cathode, a control grid and a screen grid, means connecting said cathode in series with one of said gaseous voltage regulator tubes to a point of fixed reference voltage, means for connecting said screen grid in series with said gaseous regulator tubes to said point of fixed reference voltage and means for selectively connecting said switch contacts to said screen grid and selecting said taps of said primary winding concurrently.

5. In a system for providing regulated voltages selectively in integral multiple values, means for selectively generating A.-C. voltage in integral multiple values, means for converting said A.-C. voltage to D.-C. voltage in corresponding integral multiple values, means for regulating said D.-C. voltage including a series regulator valve, means for controlling the internal impedance of said valve, said last means including a control system having a control tube, said control tube having an anode, a cathode, a control grid and a screen grid, means for maintaining said cathode and screen grid at fixed voltages above a reference voltage for all said integral multiple values, and means for providing a variable bias voltage for said control grid selected in accordance with the selected integral multiple values of D.-C. voltage.

6. The combination in accordance with claim 5 wherein said cathode voltage is maintained by a gaseous voltage regulator tube connected between said cathode and a point at said reference voltage, and wherein said screen grid voltage is maintained by a gaseous voltage regulator tube connected between said screen grid and said cathode.

7. The combination in accordance with claim 6 wherein is provided means for controlling current flow in said gaseous regulator tubes in accordance with selected integral values of said A.-C. voltage.

8. In a voltage regulator, a D.-C. voltage input lead, a D.-C. voltage output lead, a series regulating tube having an anode, cathode and grid, and having its anode connected to said input lead and its cathode connected to said output lead, a control tube for said series regulating tube having an anode, a cathode and a grid, means connecting the anode of said control tube directly to the anode of said series regulating tube, a cathode load for said control tube, a direct connection from the cathode of said control tube to the grid of said series regulating tube, a D.-C. circuit connecting said output lead to the grid of said control tube, and means for superposing on the voltage of said grid of said control tube an error signal representative of the divergence of the voltage at said output lead from a predetermined value.

9. In a voltage regulator, a D.-C. voltage input lead carrying relatively poorly regulated voltage, a D.-C. voltage output lead, a D.-C. voltage series regulator tube having a first anode, cathode and grid and having its anode connected to said input lead and its cathode connected to said output lead, a control tube having a second anode, cathode and grid, and having a cathode load, a common terminal for said first and second anodes, a common terminal for said first grid and said second cathode, means for establishing a bias on said second grid equal to the voltage on said output lead, and means for generating and superposing on said bias a D.-C. error signal representative of the divergence of the voltage of said output lead from a predetermined value.

10. The combination in accordance with claim 9 wherein is further provided a degenerative A.-C. feed-back loop between said output lead and said second grid.

11. The combination in accordance with claim 9 wherein said means for generating a D.-C. error signal includes a standard voltage source, a chopper circuit for generating an A.-C. error signal representative in phase and magnitude of the signal and magnitude of the divergence of the voltage on said output lead from a predetermined value as determined by comparison with the voltage of said standard voltage source, an A.-C. error amplifier, and an electronic phase detector for detecting the phase and amplitude of said error signal.

12. The combination in accordance with claim 11 wherein said electronic phase detector includes a pair of diodes, means comprising a transformer for applying said A.-C. error signal to said diodes in push-pull relation, means comprising a transformer for applying an A.-C. signal of reference phase to said diodes in parallel relation, and a balanced resistive load for said diodes, means connecting said output lead to one side of said resistive load, and means for connecting said second grid to the other side of said resistive load.

13. The combination in accordance with claim 12 wherein is further provided an A.-C. degenerative feed-back loop between said output lead and said second grid, said degenerative feed-back loop including means for deriving A.-C. variations only of the voltage of said output lead, means for amplifying said A.-C. variations, and means for applying the amplified variations only in degenerative phase to said second grid.

14. A voltage regulator system including a series voltage regulating tube, said tube having a cathode, an output lead connected to said cathode, means including said tube for providing selectively a plurality of discrete values of voltage at said output lead, and a resistive bleeder network for drawing a discrete fixed value of current from said output lead for all said discrete values of voltage, and a variable and unpredictable load for said system connected in parallel to said resistive bleeder network.

15. A voltage regulator, comprising a first series regulator tube, a second series regulator tube in series with said first series regulator tube, means for controlling the voltage applied to said second regulator tube from said first regulator tube comprising a first voltage reference, and means for controlling the internal resistance of said first series regulator tube in accordance with the divergence of said voltage applied to said second regulator tube from a reference value as established by said first voltage reference, a second voltage reference, and means for controlling the internal resistance of said second series regulator tube in accordance with the divergence of the voltage derived from said second regulator tube from the voltage of said second voltage reference.

16. In a voltage regulator system, a series regulator tube having a first anode, cathode and grid, and internal resistance determined in accordance with grid to cathode bias of said tube, a source of voltage connected to said first anode, means for deriving regulated voltage from said first cathode, a load connected between said first cathode and ground, said load assuming a wide variety of resistive values, a control tube having a cathode resistance, said control tube and cathode resistance connected in parallel to said series regulator tube and load, said control tube having a second cathode connected to said first grid, and having a second grid and anode, means for applying control voltage to said second grid, said last means including means for jointly applying to said second grid a voltage equal to the voltage across said load, a D.-C. degenerative voltage equal to the divergence between the voltage across said load and a standard voltage, and an A.-C. degenerative voltage representative of high frequency variations of the voltage across said load.

17. The combination in accordance with claim 16 wherein said means for applying A.-C. degenerative voltage includes a plate loaded amplifier triode having capacitive coupling from said load to its grid and capacitive coupling from its plate to said second grid.

References Cited in the file of this patent
UNITED STATES PATENTS

| | | |
|---|---|---|
| 2,117,138 | Bock | May 10, 1938 |
| 2,186,239 | Finch | Jan. 9, 1940 |
| 2,299,942 | Trevor | Oct. 27, 1942 |
| 2,301,343 | Tarr | Nov. 10, 1942 |
| 2,431,994 | Dibrell et al. | Dec. 2, 1947 |
| 2,434,069 | Goldberg | Jan. 6, 1948 |
| 2,593,066 | Singer | Apr. 15, 1952 |
| 2,693,535 | White | Nov. 2, 1954 |
| 2,701,858 | Bakeman et al. | Feb. 8, 1955 |
| 2,806,988 | Sulpizio et al. | Sept. 17, 1957 |
| 2,815,479 | Rechnitzer | Dec. 3, 1957 |